United States Patent
Kugler

(10) Patent No.: US 10,368,048 B2
(45) Date of Patent: Jul. 30, 2019

(54) METHOD FOR THE REPRESENTATION OF A THREE-DIMENSIONAL SCENE ON AN AUTO-STEREOSCOPIC MONITOR

(71) Applicant: NOVOMATIC AG, Gumpoldskirchen (AT)

(72) Inventor: Andreas Kugler, Gumpoldskirchen (AT)

(73) Assignee: Novomatic AG, Gumpoldskirchen (AT)

( * ) Notice: Subject to any disclaimer, the term of this patent is extended or adjusted under 35 U.S.C. 154(b) by 167 days.

(21) Appl. No.: 15/408,100

(22) Filed: Jan. 17, 2017

(65) Prior Publication Data

US 2017/0127037 A1 May 4, 2017

Related U.S. Application Data

(63) Continuation of application No. PCT/EP2015/066217, filed on Jul. 15, 2015, which is
(Continued)

(51) Int. Cl.
*H04N 13/30* (2018.01)
*H04N 13/122* (2018.01)
(Continued)

(52) U.S. Cl.
CPC ......... *H04N 13/122* (2018.05); *H04N 13/128* (2018.05); *H04N 13/161* (2018.05);
(Continued)

(58) Field of Classification Search
None
See application file for complete search history.

(56) References Cited

U.S. PATENT DOCUMENTS

| 6,633,655 B1 * | 10/2003 | Hong | G02B 27/225 |
| | | | 382/118 |
| 2013/0088486 A1 * | 4/2013 | Yoon | G02B 27/2214 |
| | | | 345/419 |

(Continued)

FOREIGN PATENT DOCUMENTS

EP    2413610 A2    2/2012

OTHER PUBLICATIONS

Barnum PC, Narasimhan SG, Kanade T. A multi-layered display with water drops. InACM Transactions on Graphics (TOG) Jul. 26, 2010 (vol. 29, No. 4, p. 76). ACM. (Year: 2010).*

(Continued)

*Primary Examiner* — Clifford Hilaire
(74) *Attorney, Agent, or Firm* — EIP US LLP

(57) ABSTRACT

An auto-stereoscopic monitor and method for the presentation of a three-dimensional scene on an auto-stereoscopic monitor, wherein a) a number of basic images of a scene is predefined, b) an image mask is predefined for each of the basic images, c) the individual basic images are weighted pixel by pixel or subpixel by subpixel with the values of the respectively associated image mask and are then added to form a raster image, d) the determined raster image is displayed on the screen of the auto-stereoscopic monitor, e) a current normal distance of the viewer from the monitor is determined, and f) a stretch factor is determined as a function of the determined current normal distance and a nominal distance off the screen, wherein the image masks are stretched or compressed in the direction of the horizontal image axis as a function of the stretch factor.

4 Claims, 4 Drawing Sheets

Related U.S. Application Data a continuation of application No. PCT/AT2014/050158, filed on Jul. 15, 2014.

(51) Int. Cl.
| | |
|---|---|
| *H04N 13/128* | (2018.01) |
| *H04N 13/161* | (2018.01) |
| *H04N 13/302* | (2018.01) |
| *H04N 13/312* | (2018.01) |
| *H04N 13/324* | (2018.01) |
| *H04N 13/363* | (2018.01) |
| *H04N 13/366* | (2018.01) |
| *H04N 13/373* | (2018.01) |
| *H04N 13/398* | (2018.01) |

(52) U.S. Cl.
CPC ......... *H04N 13/302* (2018.05); *H04N 13/324* (2018.05); *H04N 13/363* (2018.05); *H04N 13/366* (2018.05); *H04N 13/373* (2018.05); *H04N 13/398* (2018.05)

(56) References Cited

U.S. PATENT DOCUMENTS

| | | |
|---|---|---|
| 2013/0235005 A1 | 9/2013 | Ohyama et al. |
| 2014/0063077 A1* | 3/2014 | Wetzstein ............... G09G 3/36 345/690 |

OTHER PUBLICATIONS

Peterka T, Kooima RL, Girado JI, Ge J, Sandin DJ, Johnson A, Leigh J, Schulze J, DeFanti TA. Dynallax: solid state dynamic parallax barrier autostereoscopic VR display. In2007 IEEE Virtual Reality Conference Mar. 10, 2007 (pp. 155-162). IEEE. (Year: 2007).*

Wetzstein et al.: "Tensor Displays: Compressive Light Field Synthesis using Multilayer Displays with Directional Backlighting"; MIT Media Lab, pp. 1 to 11.

* cited by examiner

|    | 11a | | | 11b | | | 11c | | | 11d | | | 11e | | | |
|----|---|---|---|---|---|---|---|---|---|---|---|---|---|---|---|---|
|    | R | G | B | R | G | B | R | G | B | R | G | B | R | G | B | |
| 21 | 122 | | | | | 35 | | | | 178 | | | | | | |
| 22 | | 136 | | | | | | 41 | | | | 34 | | | | |
| 23 | | | 240 | | | | | | 22 | | | | 56 | | | |
| 24 | | | | 11 | | | | | 124 | | | | | 78 | | |
| 25 | | | | | 104 | | | | | | 17 | | | | 109 | |
| 31 | 1 | 0 | 0 | 0 | 0 | 1 | 0 | 0 | 0 | 0 | 1 | 0 | 0 | 0 | 0 | ........ |
| 32 | 0 | 1 | 0 | 0 | 0 | 0 | 1 | 0 | 0 | 0 | 0 | 1 | 0 | 0 | 0 | ........ |
| 33 | 0 | 0 | 1 | 0 | 0 | 0 | 0 | 1 | 0 | 0 | 0 | 0 | 1 | 0 | 0 | ........ |
| 34 | 0 | 0 | 0 | 1 | 0 | 0 | 0 | 0 | 1 | 0 | 0 | 0 | 0 | 1 | 0 | ........ |
| 35 | 0 | 0 | 0 | 0 | 1 | 0 | 0 | 0 | 0 | 1 | 0 | 0 | 0 | 0 | 1 | ........ |
| 41 | 122 | 0 | 0 | 0 | 0 | 35 | 0 | 0 | 0 | 0 | 178 | 0 | 0 | 0 | 0 | ........ |
| 42 | 0 | 136 | 0 | 0 | 0 | 0 | 41 | 0 | 0 | 0 | 0 | 34 | 0 | 0 | 0 | ........ |
| 43 | 0 | 0 | 240 | 0 | 0 | 0 | 0 | 22 | 0 | 0 | 0 | 0 | 56 | 0 | 0 | ........ |
| 44 | 0 | 0 | 0 | 11 | 0 | 0 | 0 | 0 | 124 | 0 | 0 | 0 | 0 | 78 | 0 | ........ |
| 45 | 0 | 0 | 0 | 0 | 104 | 0 | 0 | 0 | 0 | 17 | 0 | 0 | 0 | 0 | 109 | ........ |
| 50 | 122 | 136 | 240 | 11 | 104 | 35 | 41 | 22 | 124 | 17 | 178 | 34 | 56 | 78 | 109 | ........ |

Fig. 2

|  | 11a | | | 11b | | |  |
|---|---|---|---|---|---|---|---|
|  | R | G | B | R | G | B |  |
| 31a' | 0 | 1 | 0 | 1 | 0 | 1 | * 1,25 |

| 31a" | 0 | 1 | 0 | 1 | 0 | 1 |
|---|---|---|---|---|---|---|

| 31a''' | 0 | 1 | 0 | 1 | 0 | 1 |
|---|---|---|---|---|---|---|

| 31a | 0,5 | 0,75 | 0 | 1 | 0,25 | 0,5 |
|---|---|---|---|---|---|---|
|  | R | G | B | R | G | B |
|  | 11a | | | 11b | | |

Fig. 4a

|  | 11a | | | 11b | | |  |
|---|---|---|---|---|---|---|---|
|  | R | G | B | R | G | B |  |
| 31b' | 0 | 1 | 0 | 1 | 0 | 1 | * 0,75 |

| 31b" | 0 | 1 | 0 | 1 | 0 | 1 |
|---|---|---|---|---|---|---|

| 31b''' | X | 0 | 1 | 0 | 1 | 0 | 1 | Y |
|---|---|---|---|---|---|---|---|---|

| 31b |  | 0,5 | 0,25 | 0,75 | 0,5 |  |
|---|---|---|---|---|---|---|
|  | R | G | B | R | G | B |
|  | 11a | | | 11b | | |

Fig. 4b

METHOD FOR THE REPRESENTATION OF A THREE-DIMENSIONAL SCENE ON AN AUTO-STEREOSCOPIC MONITOR

CROSS-REFERENCE TO RELATED APPLICATIONS

This application is a continuation under 35 U.S.C. § 120 of PCT Application No. PCT/EP2015/066217, filed Jul. 15, 2015, which claims priority to PCT Application No. PCT/AT2014/050158, filed Jul. 15, 2014. The entire contents of each of the aforementioned applications are hereby incorporated by reference.

BACKGROUND OF THE INVENTION

The present disclosure relates to an auto-stereoscopic monitor and a method for the representation of a three-dimensional scene on an auto-stereoscopic monitor.

Various embodiments of auto-stereoscopic monitors are known from the state of the art which emit a light field which generates a three-dimensional impression for the observer when he is on a specified plane at a certain distance from the image plane. If, however, the observer moves out of this plane, the three-dimensional impression decreases as a function of the normal distance to this plane until it is no longer present at a certain distance. It is thus common to these embodiments that a predetermined range in front of the auto-stereoscopic monitor, according to the design, is available to the observer, where stereoscopic vision and thus a three-dimensional impression is possible. Various methods are known from the state of the art in which the exact position of the observer in front of the screen is determined in each case, and then a light field optimized for this position is determined for the respective observer and displayed to the observer. Such methods are very CPU-intensive and are usually used only for special cases. The object of the present disclosure is to provide a method which expands, in a simple and resource-saving manner, the predetermined range where stereoscopic vision is possible in front of the auto-stereoscopic monitor. The predetermined plane where the observer would see an optimal stereoscopic image can therefore be shifted forward or backward on a normal to the screen plane by this method.

SUMMARY

This disclosure provides a method for the representation of a three-dimensional scene on an auto-stereoscopic monitor, wherein: a) a number N of basic images of a scene is specified, which respectively show the image to be displayed from different viewing angles, b) an image mask for each of the respective basic images with the size of a native screen resolution of the monitor or of a subregion of the monitor is specified, c) the individual basic images are weighted according to pixel or sub-pixel with the values of the image mask assigned to them and are then added to a raster image, d) the raster image determined in such a manner is displayed on the screen of the auto-stereoscopic monitor, e) a current normal distance of the observer from the monitor is determined normal to the screen plane of the monitor, and f) a stretching factor is determined as a function of the determined current normal distance and the nominal distance of the screen, wherein the image masks are stretched or compressed in the direction of the horizontal image axis as a function of the stretching factor. As an alternative to step f), the image masks can also be stretched or compressed in the direction of the horizontal image axis, wherein the stretching factor is indirectly proportional to the determined normal distance.

This results in the advantageous effect that the precise position of the observer in front of the monitor is not necessary, but rather only any change in the normal distance of the observer from the monitor for a new calculation of the individual image masks, and this recalculation can be carried out in a particularly simple and resource-saving manner. This results in a barely perceptible deterioration of the image quality for the human eye due to the interpolation.

One embodiment of the optical properties provides for a number of optical elements to be assigned to an image line of the screen, wherein the color and/or brightness values originating from each basic image are projected to a respective projection point via the respective optical elements, which has a predetermined distance to the auto-stereoscopic monitor, wherein the distance between each two adjacent projection points on the straight line on which the observer is currently located substantially corresponds to the respective distance between each two adjacent projection points on the straight line with a nominal distance from the auto-stereoscopic monitor.

In order to enable an optimal adaptation to the user with low resource requirements, it can be provided that step e) is performed once or at predetermined updating time points, in particular continuously, and the normal distance is again measured and updated and that step f) is performed again when changing the determined normal distance or after each determination of the normal distance.

In order to display moving images, one can provide a video data structure for the representation of moving scenes, wherein for each point in time N basic images of the scene are available, and steps b) to e) are executed for each point in time.

According to one exemplary embodiment, one can provide that the image masks that are stretched or compressed as a function of the stretching factor are aligned, in particular horizontally centered, so that the horizontal center of the stretched or compressed image masks coincides with the horizontal center of the original image mask, and wherein matrix values of the aligned image masks are transferred to matrix values of a new image mask by means of interpolation, wherein the new image mask has the same resolution and width as the original image mask, and wherein steps c) and d) are performed with the new image mask.

Furthermore, this disclosure solves the problem with an auto-stereoscopic monitor for representing a three-dimensional scene which provides a number of basic images which show the scene to be displayed from different viewing angles. The monitor comprises: for each of the basic images, a memory for an image mask with the size of a native screen resolution of the monitor, or a partial area adapted to the stereoscopic display window thereof; a weighting unit which weights the individual basic images on the basis of sub-pixels with the values of the respective image mask assigned to them and then adds them, a screen for displaying a raster image, and optical elements which map light originating from the basic images to points on a straight line when using a basic image mask, a detection unit for determining the normal distance of the observer from the monitor normal to the image plane of the monitor, and an updating unit which determines a stretching factor as a function of the normal distance when the normal distance of the observer changes, wherein the image masks are stretched or compressed according to the horizontal image axis as a function of the stretching factor.

One embodiment of the optical properties provides that the distance between each two adjacent points on the straight line on which the observer is located corresponds to the distance between each two adjacent points on the straight line with a nominal distance (i.e. nominal distance) to the auto-stereoscopic monitor.

BRIEF DESCRIPTION OF THE DRAWINGS

FIG. 2 schematically shows the determination of intermediate results and factors.

FIG. 4a shows the calculation of the image to be displayed by stretching the image mask.

FIG. 4b shows the calculation of the image to be displayed by compression of the image mask.

DETAILED DESCRIPTION OF CERTAIN INVENTIVE EMBODIMENTS

In order to represent a stereoscopic image of a scene, a number of basic images 21, 22, 23, 24, 25 are provided which respectively show the three-dimensional scene to be displayed from different viewing angles (FIG. 2). In the present embodiment, during the creation of the basic images 21, 22, 23, 24, 25, the same scene was recorded from five recording positions respectively with the same orientation, wherein the five recording positions are arranged evenly offset from one another on a straight line normal to the image axis of the camera. The size of the basic images corresponds to the native resolution of the screen; in any case, the basic images, first of all, can be converted, in particular interpolated, to the native resolution. The native resolution is understood to be the resolution of the pixels actually present on the monitor. Alternatively, there is also the possibility that only a partial area of the screen is used for the creation of a light field. In this case, one embodiment can also be implemented on a partial area of the display of the monitor.

The individual cameras basically have the same orientation, though they show different sections of their viewing area. They have different projection matrices; the camera settings are therefore generally not identical. Therefore, basic images can perspectively be slightly different images which were usually taken offset horizontally, wherein each two adjacent images respectively result in an optimal stereoscopic image. For example, five (input or) basic images yield four stereoscopic images; eight (input or) basic images yield seven stereoscopic images.

Figure 1:
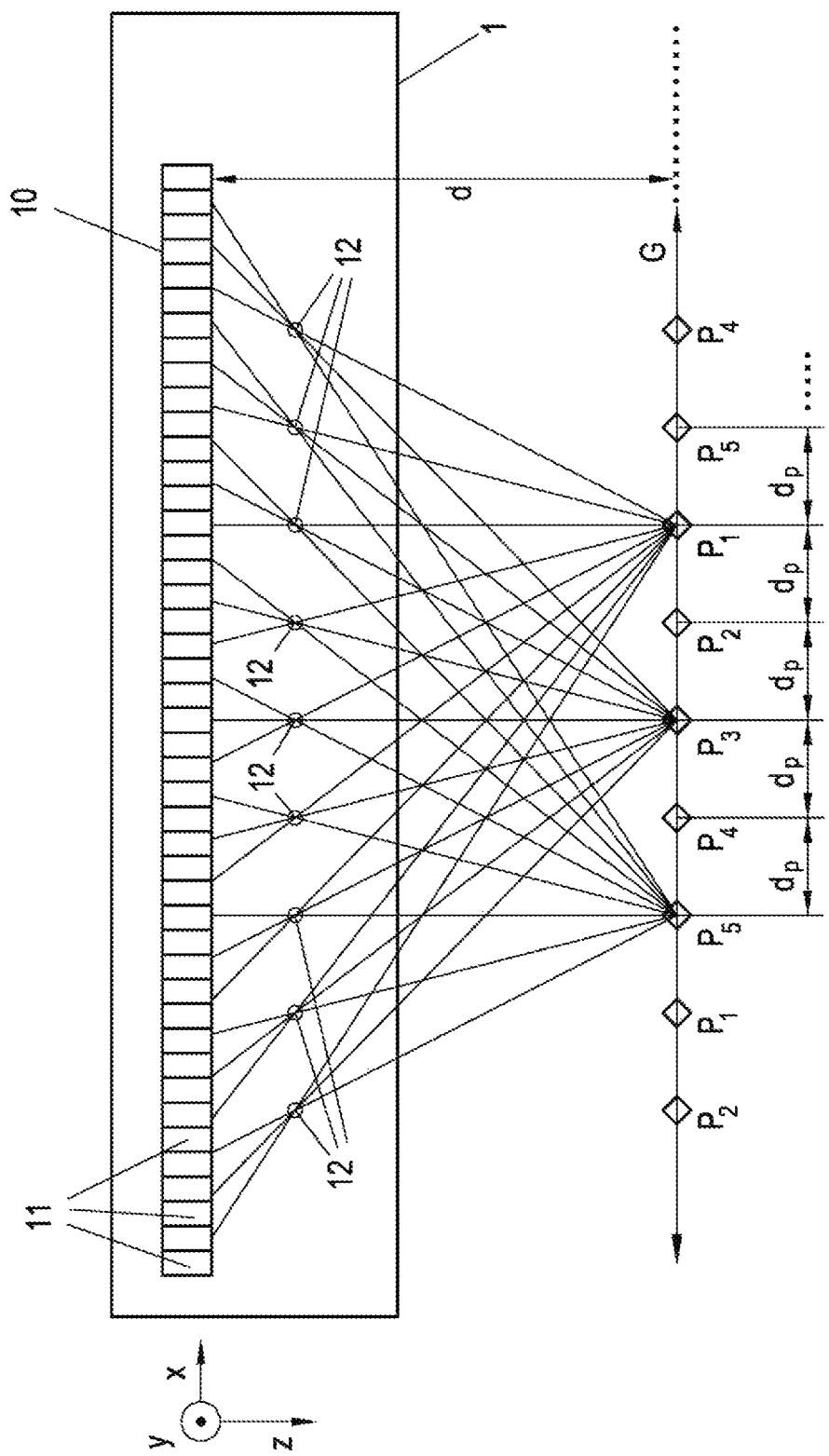
FIG. 1 shows the procedure known from the prior art.

One embodiment of this disclosure is explained in more detail with reference to the accompanying drawing figures. FIG. 1 shows the procedure known from the prior art. An auto-stereoscopic monitor 1 is hereby shown which has a display unit, wherein the display unit 10 comprises a number of display pixels 11 arranged in a grid pattern. A color monitor is shown in the present case. In this case, each of the display pixels 11 comprises a number of sub-pixels.

In FIG. 1, only a single image line is displayed with such display pixels 11 (in the horizontal image axis x). The auto-stereoscopic monitor 1 has a plurality of image lines arranged on top of one another (in vertical image axis y) in the display plane of the display unit 10 with essentially the same structure. A number of optical elements 12 are assigned to the respective image line of the auto-stereoscopic monitor 1, which are represented by circles in FIG. 1.

The individual image points of the basic images 21, 22, 23, 24, 25 are brought into display at different points of the screen 10 of the auto-stereoscopic monitor 1. As seen from FIG. 1, an image, color value or brightness value is shown in the sub-pixel displayed to the far left, which originates from the first basic image 21 and comes from the respective line shown and the leftmost column of the first basic image 21. The color or brightness value of the respective pixel position from the second basic image 22 is displayed in the subsequent second sub-pixel of the displayed line of the screen 1. In the subsequent third sub-pixel of the displayed line of the screen, the color or brightness value of the respective pixel position is displayed from the third basic image 23, etc. In the sixth sub-pixel of the displayed line of the screen, the color or brightness value of the respective pixel position is again displayed from the first basic image 21. This sub-pixel correlation is also performed with the further image points, wherein the correlation is repeated on the horizontal image axis x and the color or brightness values of the individual basic images are displayed in each case.

Due to the bundling of the light of the sub-pixels in the optical elements 12 and the arrangement of the individual optical elements 12, all the color or brightness values originating from the first basic image 21 are projected to a point P1 which has a predetermined distance d (in the z axis) to the auto-stereoscopic monitor 1 (in the x-y plane).

Also, all the color and brightness values originating from the second basic image 22 and displayed on the screen of the auto-stereoscopic monitor are bundled in a second point P2, which also has the distance d from the auto-stereoscopic monitor. Likewise, the color and brightness values of the remaining basic images 23, 24, 25 are each bundled in respective points P3, P4, P5, which have a distance d from the auto-stereoscopic monitor.

All of these points P1, P2, P3, P4, P5 are located on the same straight line G, which runs essentially parallel to and at a distance d to the nominal distance from the auto-stereoscopic monitor. Such a procedure leads to the fact that the eyes of an observer, which are located at a distance d from the auto-stereoscopic monitor 1 on the straight line G, can perceive a stereoscopic image of the recorded scene. The nominal distance can be regarded as any distance from the monitor at which an observer can perceive the best stereoscopic image. In order to achieve a particularly advantageous adaptation to the eyes, the distance and the extent of the optical elements 12 as well as the distance of the optical elements 12 from the screen 10 to the individual image points 11 are arranged on the screen 10 such that between adjacent points P1, P2, P3, P4, P5 on which the respective adjacent basic images 21, 22, 23, 24, 25 are mapped, the average eye distance is approximately 6.5 cm, or a smaller distance dp, so that two different, in particular adjacent, basic images 21, 22, 23, 24, 25 are projected to the eyes of the observer and thus a stereoscopic impression of the scene arises. The distance dp can also be substantially smaller in order to reduce the distance of the recording positions of the basic images relative to one another and thus to achieve a softer gradient with the "look-around" effect.

As can be seen from the present embodiment (FIG. 2), each of the basic images 21, 22, 23, 24, 25 is subjected to a separate filtering which is permeable at periodic intervals and suppresses the color and brightness values of the respective other basic images 21, 22, 23, 24, 25. A separate image mask 31, 32, 33, 34, 35 is used for each basic image 21, 22, 23, 24, 25, wherein in each sub-pixel 11, the color and intensity values of a different basic image 21, 22, 23, 24, 25 are displayed. The sum of all image masks results in a one-matrix. FIG. 2 shows the computation steps and intermediate results necessary for the determination of an image line in more detail, wherein one line of the basic images 21, 22, 23, 24, 25, the respective image masks 31, 32, 33, 34, 35 as well as the results of the image masks 41, 42, 43, 44, 45 are shown during application to the respective basic images 21, 22, 23, 24, 25. In other words, the image mask 31 is assigned to the basic image 21 and the result 41 is obtained, etc. The line 50 represents the resulting raster image from all results 41 to 45.

The color and brightness values of the first basic image 21 are in each case multiplied according to sub-pixel by the mask values of the first image mask 31, analogous to a matrix multiplication, whereby an intermediate result 41 is obtained. Likewise, the color and brightness values of the remaining basic images 22, 23, 24, 25 are multiplied according to pixel by the mask values of the respective image masks 32, 33, 34, 35 assigned to them, whereby an intermediate result 42, 43, 44, 45 is obtained. The individual intermediate results 41, 42, 43, 44, 45 are then added to a final raster image 50 to be displayed on the screen 11. A weighting unit is used for the determination of the raster image, which respectively has storage for the image masks 31, 32, 33, 34, 35 as well as for the basic images 21, 22, 23, 24, 25 and due to the weighting performed, provides a raster image 50 at its output and outputs it to the screen 10 of the auto-stereoscopic monitor 1.

FIG. 2 represents the procedure for a single image line (in the horizontal image axis x), wherein the procedure for the further individual image lines of a monitor is basically performed identically, however, the periodic sub-pixel correlation for each image line can be shifted horizontally by a specific offset to the respective preceding image line.

Often, the lenses or parallax barriers are positioned diagonally in 3D monitors at a certain angle, e.g. in the case of slanted lenticular lens, in order to evenly divide the resulting resolution reduction in the 3D operation onto the x- and y-axis (the monitor plane), in which case the sub-pixel correlation in each line is shifted to the right or left by a specific horizontal offset relative to the respective previous one pixel line.

Usually, it is not necessary that all the individual color and brightness values of the image points are subjected to a complete filtering, i.e., with three-color image points, the red, green and blue portions of the basic images 21, 22, 23, 24, 25. Rather, it is also possible that only individual color portions of image points 11 are weighted according to sub-pixel, i.e., in each case separately and corresponding to the arrangement on the screen 10, wherein the sub-pixel used for the respective color corresponding to the arrangement is taken into account in the image line of the screen 10 of the auto-stereoscopic monitor 1. In the present case, the individual sub-pixels are arranged on the screen of the auto-stereoscopic monitor 1 in the order . . . RGBRGB-RGB . . . , so that the formation of the color and intensity values of the far left image point 11a is from the first basic image 21 of the red channel of the far left image point 11a, from the second basic image 22 of the green channel of the far left image point 11a, and from the third basic image 23 of the blue channel of the far left image point 11a. The red value of the fourth basic image 24, the green value of the fifth basic image 25, and the blue value of the first basic image 21 are accordingly used for the second image point 11b of the respective image line adjacent to the leftmost image point 11a. This procedure is continued for the entire image line according to the predefined image mask.

Figure 3:
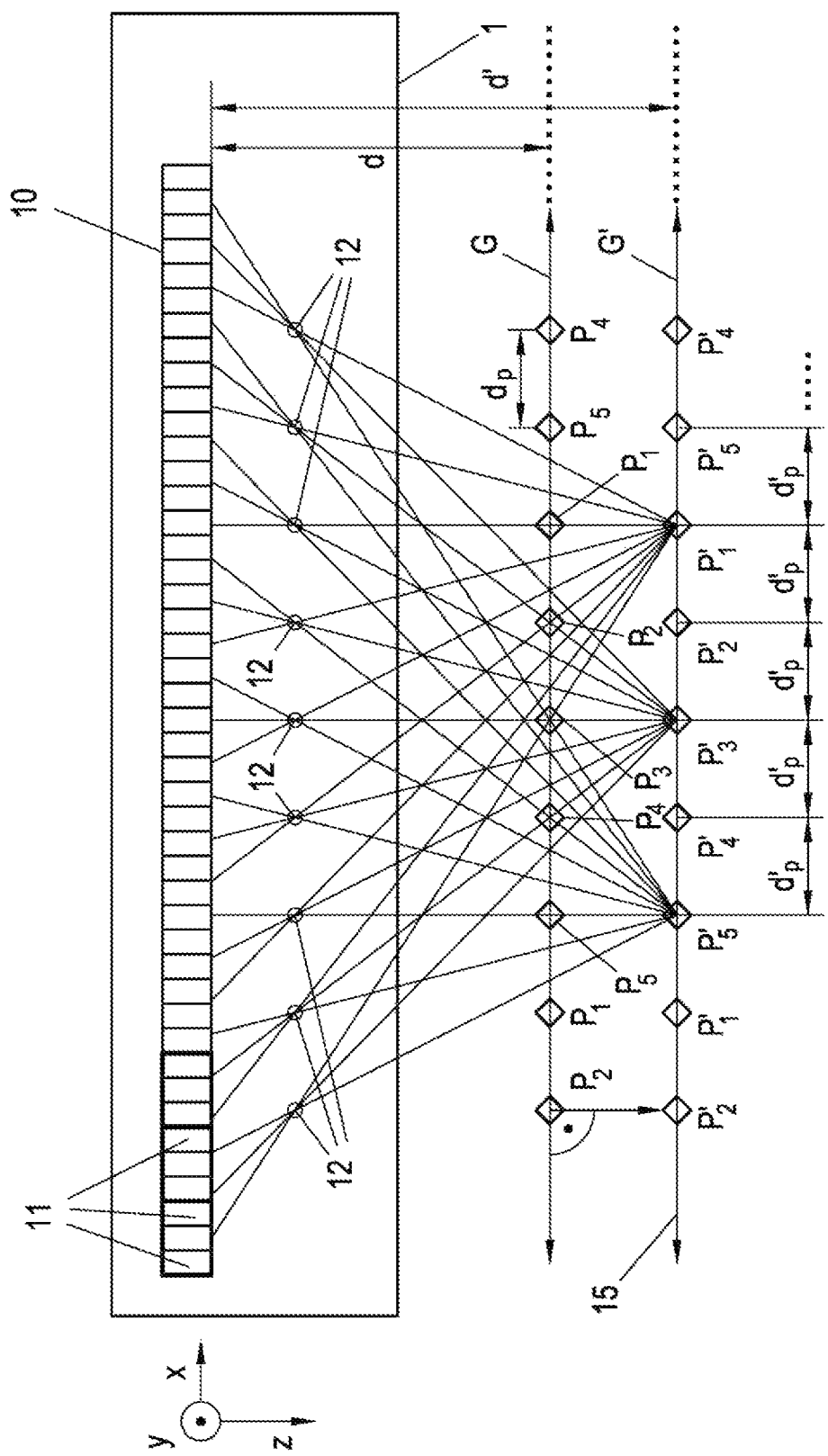
FIG. 3: shows a procedure modified in comparison to the prior art (FIG. 1) in which the respective distance of the user from the monitor is taken into account.

An approach for producing a stereoscopic image when the observer is not at a distance of the nominal distance d from the screen 1 is described in more detail in FIG. 3. A substantial advantage compared to the methods known from the prior art is that the optical elements 12 or the image point 11 need not be changed compared to their predetermined positions, and only the image masks 31, 32, 33, 34, 35 are determined again. FIG. 3 shows a straight line G', which is located at a normal distance d' from the screen 1, wherein this normal distance d' of the observer from the auto-stereoscopic monitor 1 does not directly correspond to the nominal distance d of the auto-stereoscopic monitor 1. In order to be able to generate an optimum light field for the observer on the straight line G' when the normal distance d' of the observer to the auto-stereoscopic monitor 1 is known, a modification of the method described at the beginning is provided in the following, wherein only the image masks 31, 32, 33, 34, 35 are adapted to the different current distance d' (i.e., the actual normal distance d').

In a first step, the normal distance d' of the respective observer to the auto-stereoscopic screen 1 is determined by means of a detection unit, e.g., determined by means of a user-directed camera, or of any distance. The normal distance of the observer is thereby determined as a distance, thus the distance between the observer and the monitor normal to the image plane of the monitor. In order to control the screen 10 such that a light field corresponding to the scene is emitted by the monitor for an observer with an arbitrary normal distance d', the individual image masks 31, 32, 33, 34, 35 are stretched or compressed by a value dependent on the normal distance d' of the observer. One possibility of determining the stretching factor s as a function of the nominal distance d and the actual normal distance d' provides that the stretching factor s is formed from a quotient or ratio of the nominal distance d to the actual distance d'.

The compression (FIG. 4b) or stretching (FIG. 4a) of the image masks 31, 32, 33, 34, 35 can be performed with all interpolation methods specified or known from the prior art, wherein the basic image masks 31', 32', 33', 34', 35' are primarily output from the image masks 31, 32, 33, 34, 35 shown in FIG. 2. If there is compression, a compressed basic image mask 31", 32", 33", 34", 35" is created first. Individual regions of the basic image mask 31", 32", 33", 34", 35", which are used for the later weighting of the basic images, remain undefined by the compression (FIG. 4b). For this reason, a supplementary basic image mask 31''', 32''', 33''', 34''', 35''' is created, in which the regions remaining undefined in the compressed basic image mask are determined on the basis of X, Y values. This can be done either by setting the regions X, Y to zero. However, it is also possible to add missing sub-pixels on the outside in the regions X, Y through the periodic continuation of the basic image masks 31', 32', 33', 34', 35'.

FIGS. 4a and 4b show the creation of an image mask 31 in more detail, wherein FIG. 4a shows a stretching with a stretching factor 1.25 and FIG. 4b shows a compression with a stretching factor 0.75.

In order to illustrate the computational approach, a matrix with a 3-fold width and a 1-fold height of the native pixel resolution of a part of the screen is shown so that the number of elements of the matrix corresponds to the number of sub-pixels of the part of the screen. The matrix elements of the basic image mask 31' alternately bear the values 1 and 0, or the matrix elements are alternately assigned the values 0 and 1. In the final procedure, the matrix elements of the basic image masks can, however, have values in the range of values between 0 and 1, i.e., the value 0, the value 1, or all possible values in between. It is actually possible, but not mandatory, for the values to form a periodic pattern. The basic image mask 31' extends essentially over the entire (horizontal) basic image or over the entire screen 10. In a first step, the basic image mask 31a', 31b' is stretched by the stretching factor s (FIG. 4a) when the stretching factor s is greater than 1 (FIG. 4b) or compressed when the stretching factor s is less than 1; a stretched or compressed basic image mask 31a" or 31b" is obtained. Then the stretched or compressed basic image mask 31a", 31b" is horizontally centered, so that the horizontal center of the basic image mask 31a''', 31b''' coincides with the horizontal center of the basic image mask 31a', 31b'. In a last step, the aligned (centered) basic image masks 31a''', 31b''' are transmitted to a new image mask 31a, 31b by means of interpolation, wherein the new image mask 31a, 31b has the same resolution and width as the original basic image mask 31a', 31b' and thus can be displayed on the screen 10. A linear interpolation can be used for the transmission by means of interpolation, wherein the ratio of the width of the individual RGB matrix regions of the basic image mask 31a', 31b" to the width of the RGB matrix regions of the stretched or compressed basic image mask 31a" or 31b" is used and in this case in particular only those sections (lengths) of the RGB matrix regions which have the value 1 are divided. Thus, as shown by example in FIG. 4a, the red value R of the first image point 11a of the new image mask 31a receives the value "0.5", the green value G of the first image point 11a receives the value "0.75" since the corresponding RGB matrix region of the stretched image mask 31a" overlaps by half the red value R of the first image point 11a of the new image mask 31a and the green value overlaps by three quarters. In other words, a respective matrix region value of the stretched image mask 31a''' (or compressed image mask 31b''') is divided in the ratio of the overlapping of two adjacent matrix regions of the new image mask 31a (or 31b) and the corresponding divided value is assigned to the new image mask 31a. Matrix regions of the stretched image mask 31a" with a value "0" must also yield the value "0" for the adjacent matrix regions of the new image mask 31a.

There is the problem in the compressed basic image mask 31b" illustrated in FIG. 4b in that no values are specified for the displayed regions X, Y of the centered basic image mask 31b'''. On the one hand, it is possible to fill these regions X, Y with zeros in order to have sufficient values available for the interpolation to be performed. In this case, the red value R of the first image point 11a receives, for example, the value 0, the blue value B of the second image point 11b receives the value 0.25.

Alternatively, it is also possible to periodically continue the regions of the basic image mask 31b''' and to perform the interpolation in this manner. By a periodic continuation, the region X would receive the value 1, the region Y the value 0. In this case, the red value R of the first image point 11a receives the value 0.75, the blue value B of the second image point 11b the value 0.25.

By changing (stretching, compression) the image masks 31, 32, 33, 34, 35, the light from sub-pixels that originates from the same basic image 21, 22, 23, 24, 25 is mapped to the same point P1', P2', P3', P4', P5' on the straight line G' (FIG. 3). The distance dp' between two adjacent points P1', P2', P3', P4', P5' on the straight line G' on which the observer is located corresponds to the distance dp between each two adjacent points P1, P2, P3, P4, P5 on the straight line G with a nominal distance d to the auto-stereoscopic monitor 1. The change in the image masks 31, 32, 33, 34, 35 is made by an updating unit according to the distance d' of the observer from the monitor 1.

By the procedure cited above, the image masks 31, 32, 33, 34, 35 have a stretched or compressed distribution compared to the basic image mask. The image masks 31, 32, 33, 34, 35 are stretched or compressed in the direction of the horizontal image axis such that the stretching of the individual image masks 31, 32, 33, 34, 35 is indirectly proportional to the determined normal distance d'. The raster image 50 is displayed on the screen 10 of the auto-stereoscopic monitor 1. A number of basic images 21, 22, 23, 24, 25 are available for each display time point during the running operation of the auto-stereoscopic monitor 1. The normal distance d' of the observer from the monitor 1 normal to the screen plane of the monitor 1 is continuously detected or otherwise determined. If the normal distance d' of the user from the auto-stereoscopic monitor 1 is changed, the image masks 31, 32, 33, 34, 35 are correspondingly recalculated and the representation of the basic images 21, 22, 23, 24, 25 takes place as a result of the newly created image masks 31, 32, 33, 34, 35.

What is claimed is:

1. A method for representing a three-dimensional scene on an auto-stereoscopic monitor, the method comprising:
    a) displaying a number N of basic images which respectively show an image to be displayed from different viewing angles;
    b) providing an image mask for each of the basic images, each with a size of a native screen resolution of the auto-stereoscopic monitor or of a subregion of the auto-stereoscopic monitor;
    c) determining a current normal distance of an observer from the auto-stereoscopic monitor normal to a screen plane of the auto-stereoscopic monitor;
    d) determining a stretching factor as a function of the current determined normal distance;
    e) weighting the basic images according to pixel or sub-pixel with the values of the respective image mask assigned to them and subsequently adding to a raster image;
    f) displaying the raster image on a screen of the auto-stereoscopic monitor;
    g) stretching or compressing the image masks in the direction of a horizontal image axis as a function of the stretching factor by means of interpolation, wherein the stretched or compressed image mask has the same resolution and width as the image mask before being stretched or compressed;
    h) horizontally centering the stretched or compressed image masks, so that the horizontal center of the stretched or compressed image masks coincides with the horizontal center of the image mask before being stretched or compressed; and
    wherein:
        a number of optical elements are assigned to an image line of the screen;
        color and/or brightness values originating from each basic image are projected to a respective projection point via a respective optical element; and
        a distance between two adjacent projection points, on a straight line at the current normal distance to the screen, corresponds to a respective distance between a respective two adjacent projection points on a straight line at the nominal distance to the screen.

2. The method according to claim 1, wherein step c) is repeated at a predetermined updating time, and steps d), g) and h) are repeated if a change in the determined current normal distance is detected.

3. The method according to claim 1, wherein a video data structure is provided for a representation of moving three-dimensional scenes, wherein the N basic images of the scene are available for each of a plurality of points in time, and at least the steps b), e), f), and h) are executed for each time point.

4. An auto-stereoscopic monitor for displaying a three-dimensional scene, which is provided as a number of basic images which respectively show the scene to be displayed from different viewing angles, the auto-stereoscopic monitor comprising:
- a memory for storing an image mask for each of the basic images, each of the image masks associated with a size of a native screen resolution of the auto-stereoscopic monitor, or of a partial area adapted to the auto-stereoscopic display window thereof;
- a weighting unit adapted to specify a number of basic image masks;
- a screen for displaying a raster image;
- optical elements which, when using a basic image mask, respectively map a light originating from the basic images to points on a straight line;
- a detection unit for determining a current normal distance of an observer from the auto-stereoscopic monitor normal to an image plane of the auto-stereoscopic monitor; and
- an updating unit which determines a stretching factor as a function of the normal distance and a nominal distance when the normal distance of the observer changes, wherein the image masks are stretched or compressed in the direction of the horizontal image axis as a function of the stretching factor;

wherein the weighting unit is adapted to weight the individual basic images according to sub-pixels with the values of the respective image mask assigned to them and then adds them, and to stretch compress the image masks in the direction of the horizontal image axis as a function of the stretching factor by means of interpolation of the image mask, wherein the stretched or compressed image masks have the same resolution and width as the image mask before being stretched or compressed;

to center the stretched or compressed image masks horizontally, so that the horizontal center of the stretched or compressed image masks coincides with the horizontal center of the image mask before being stretched or compressed; and wherein the distance between two adjacent projection points on a straight line at the current normal distance from the screen, corresponds to a distance between two respective adjacent projection points on a straight line at the nominal distance from the screen.

\* \* \* \* \*